United States Patent
Su et al.

(10) Patent No.: US 11,791,545 B2
(45) Date of Patent: Oct. 17, 2023

(54) KEYBOARD MODULE

(71) Applicant: Chicony Electronics Co., Ltd., New Taipei (TW)

(72) Inventors: Chin-Chan Su, New Taipei (TW); Yen-Ching Lee, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 83 days.

(21) Appl. No.: 17/710,999

(22) Filed: Mar. 31, 2022

(65) Prior Publication Data

US 2023/0178883 A1 Jun. 8, 2023

(30) Foreign Application Priority Data

Dec. 7, 2021 (TW) ................................ 110145658

(51) Int. Cl.
*H01Q 1/22* (2006.01)
*H01Q 1/38* (2006.01)
*G06F 3/023* (2006.01)
*H01Q 9/06* (2006.01)

(52) U.S. Cl.
CPC ............. *H01Q 1/38* (2013.01); *G06F 3/0231* (2013.01); *H01Q 9/06* (2013.01)

(58) Field of Classification Search
CPC ........ H01Q 1/243; H01Q 1/2258; H01Q 1/24; H01Q 1/38; H01Q 9/06; H01Q 1/2266; H01Q 9/42; H01Q 21/28; G06F 3/0231; G06F 2203/0384; G06F 3/0202
See application file for complete search history.

(56) References Cited

U.S. PATENT DOCUMENTS

| | | | |
|---|---|---|---|
| 8,519,904 B2 | 8/2013 | Hsu et al. | |
| 2012/0162890 A1 | 6/2012 | Chuang et al. | |
| 2014/0132461 A1* | 5/2014 | Kim | G06F 1/1698 343/702 |
| 2015/0146357 A1* | 5/2015 | Chang | H01Q 7/06 361/679.09 |

FOREIGN PATENT DOCUMENTS

| | | |
|---|---|---|
| CN | 102419633 | 4/2012 |
| TW | 201227235 | 7/2012 |

OTHER PUBLICATIONS

"Office Action of Taiwan Counterpart Application", dated Jun. 27, 2022, p. 1-p. 8.

* cited by examiner

*Primary Examiner* — David E Lotter
(74) *Attorney, Agent, or Firm* — JCIPRNET

(57) ABSTRACT

A keyboard module includes a housing, an antenna circuit board, a supporting bracket, an antenna, and a plurality of key caps. The housing includes a bottom wall and a side wall. The antenna circuit board is disposed above the bottom wall. The supporting bracket is disposed above the antenna circuit board, and a gap is formed between an edge of the supporting bracket and the side wall. The supporting bracket includes a notch recessed into the edge, and the notch faces the side wall. The antenna is disposed in the gap, extends into the notch, and is connected to the antenna circuit board. These key caps are disposed above the supporting bracket.

13 Claims, 7 Drawing Sheets

KEYBOARD MODULE

CROSS-REFERENCE TO RELATED APPLICATION

This application claims the priority benefit of Taiwan application serial no. 110145658, filed on Dec. 7, 2021. The entirety of the above-mentioned patent application is hereby incorporated by reference herein and made a part of this specification.

BACKGROUND

Technical Field

The disclosure relates to a keyboard module, and in particular, relates to a keyboard module having an antenna.

Description of Related Art

At present, in wireless keyboards, one of the commonly used antenna forms is to install an antenna on a circuit board. The circuit board corresponding to this type of antenna needs to provide a sufficient clearance zone, and the antenna needs to have a large-size ground plane that is spaced apart from the antenna by a certain distance in order to implement effective radiation.

However, most of the wireless keyboards cannot maintain a large-size clearance zone on the circuit board due to the factor of structural design or appearance. In addition, since a supporting bracket (iron plate) is often used in the wireless keyboard to strengthen structural strength, the internal space of the wireless keyboard is limited. As such, the circuit board may overlap with the supporting bracket (iron plate), and the supporting bracket may be connected with the ground plane on the circuit board. A distance between the antenna and the ground plane in the up-down direction (vertical direction) is excessively close, resulting in a decrease in the antenna radiation efficiency and deviation of the radiation field pattern.

Another way is to allow a chip antenna to be disposed on the circuit board, and this type of chip antenna requires a smaller clearance zone, but the antenna efficiency is poor.

SUMMARY

The disclosure is directed to a keyboard module having an antenna adapted to provide good antenna efficiency.

The disclosure provides a keyboard module including a housing, an antenna circuit board, a supporting bracket, an antenna, and a plurality of key caps. The housing includes a bottom wall and a side wall. The antenna circuit board is disposed above the bottom wall. The supporting bracket is disposed above the antenna circuit board, and a gap is formed between an edge of the supporting bracket and the side wall. The supporting bracket includes a notch recessed into the edge, and the notch faces the side wall. The antenna is disposed in the gap, extends into the notch, and is connected to the antenna circuit board. The key caps are disposed above the supporting bracket.

In an embodiment of the disclosure, the antenna includes a first portion, and the first portion is located in the gap and is coplanar with the supporting bracket.

In an embodiment of the disclosure, the first portion of the antenna is a straight-line section close to the side wall of the housing, and the first portion is parallel to the side wall.

In an embodiment of the disclosure, the antenna includes a second portion bendably connected to the first portion and a third portion bendably connected to the second portion. The second portion extends into the notch, and the third portion extends toward the antenna circuit board and is connected to the antenna circuit board.

In an embodiment of the disclosure, the second portion of the antenna is a straight-line section perpendicular to the first portion, and the third portion of the antenna is a straight-line section perpendicular to the second portion.

In an embodiment of the disclosure, a distance between the second portion and the edge of the supporting bracket surrounding the notch is between 1 mm and 2 mm.

In an embodiment of the disclosure, a distance between the first portion of the antenna and the edge of the supporting bracket is between 3 mm and 8 mm.

In an embodiment of the disclosure, the notch corresponds to a position between two of the key caps.

In an embodiment of the disclosure, the key caps are arranged in a plurality of rows, and a projection of the notch on a plane where the key caps are located only corresponds to the row closest to the side wall.

In an embodiment of the disclosure, the keyboard module further includes an insulating bracket, which is arranged on the antenna circuit board and supports the antenna.

In an embodiment of the disclosure, the antenna couples out a frequency band, and a length of the antenna is less than or equal to ¼ wavelength of the frequency band.

In an embodiment of the disclosure, a material of the side wall is an insulating material.

In an embodiment of the disclosure, the antenna circuit board is connected to the supporting bracket.

Based on the above description, conventionally, the entire antenna is arranged on the circuit board, and an antenna clearance zone is required to be maintained on the circuit board. As such, a circuit layout of the circuit board is affected or antenna performance is affected due to an insufficient antenna clearance zone. Compared with the conventional structure, in the keyboard module provided by the disclosure, the originally-existing gap between the edge of the supporting bracket and the side wall of the housing is arranged to house the antenna, and this gap is treated as the antenna clearance zone, so that the space on the antenna circuit board is not required to be occupied, and the problem of insufficient clearance zone may be effectively solved. In addition, the antenna is arranged in the gap and extends into the notch of the supporting bracket. The antenna does not overlap with the supporting bracket in the up-down direction, and in this way, good performance is provided, and a complete radiation field pattern is achieved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Embodiments are provided for facilitating the descriptions of the instant disclosure. However, the embodiments are provided as examples for illustrative purpose, but not a limitation to the instant disclosure. In all the figures, the same reference numbers refer to identical or similar elements.

Figure 1:
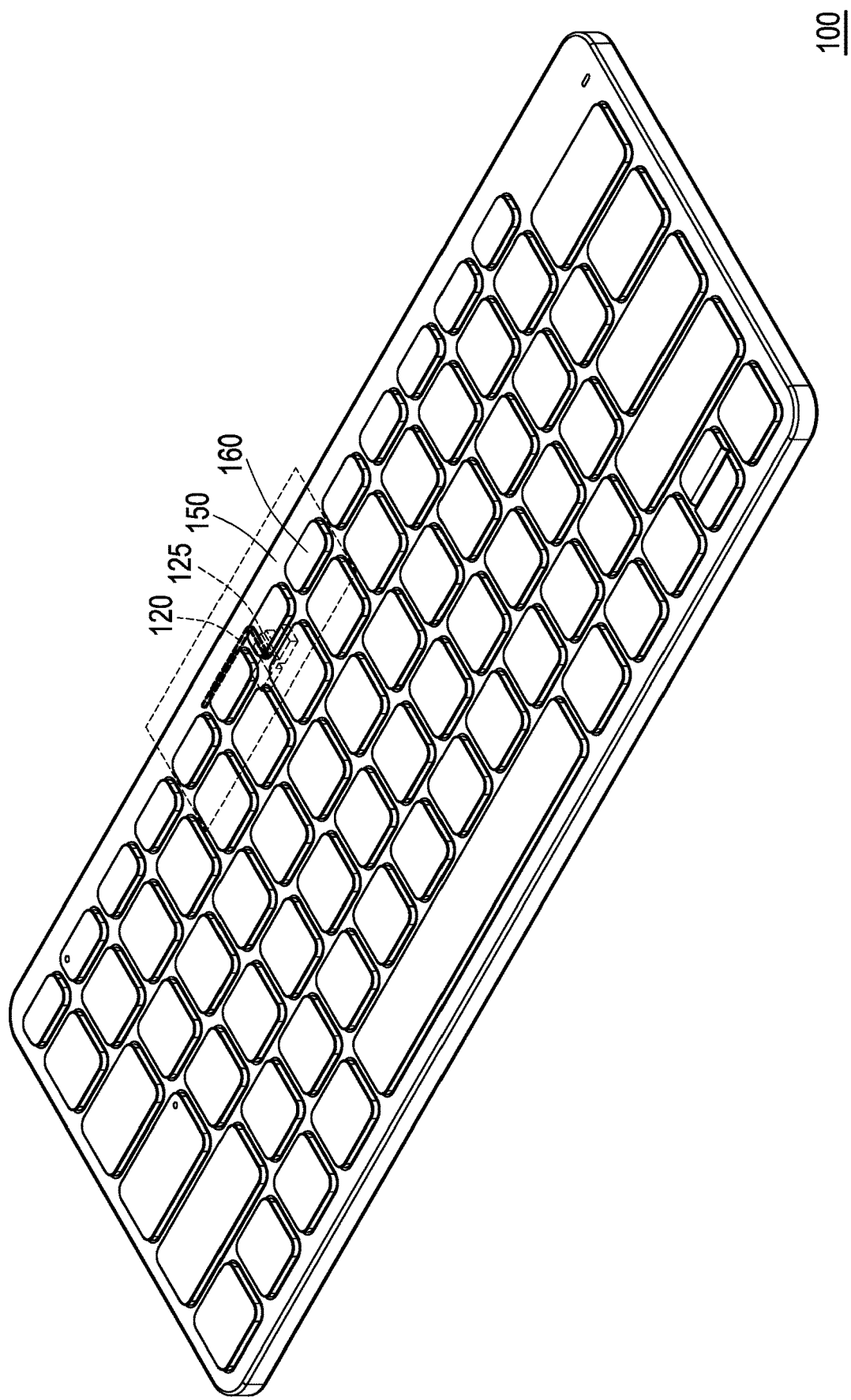
FIG. 1 is a schematic view of a keyboard module according to an embodiment of the disclosure.
Figure 2:
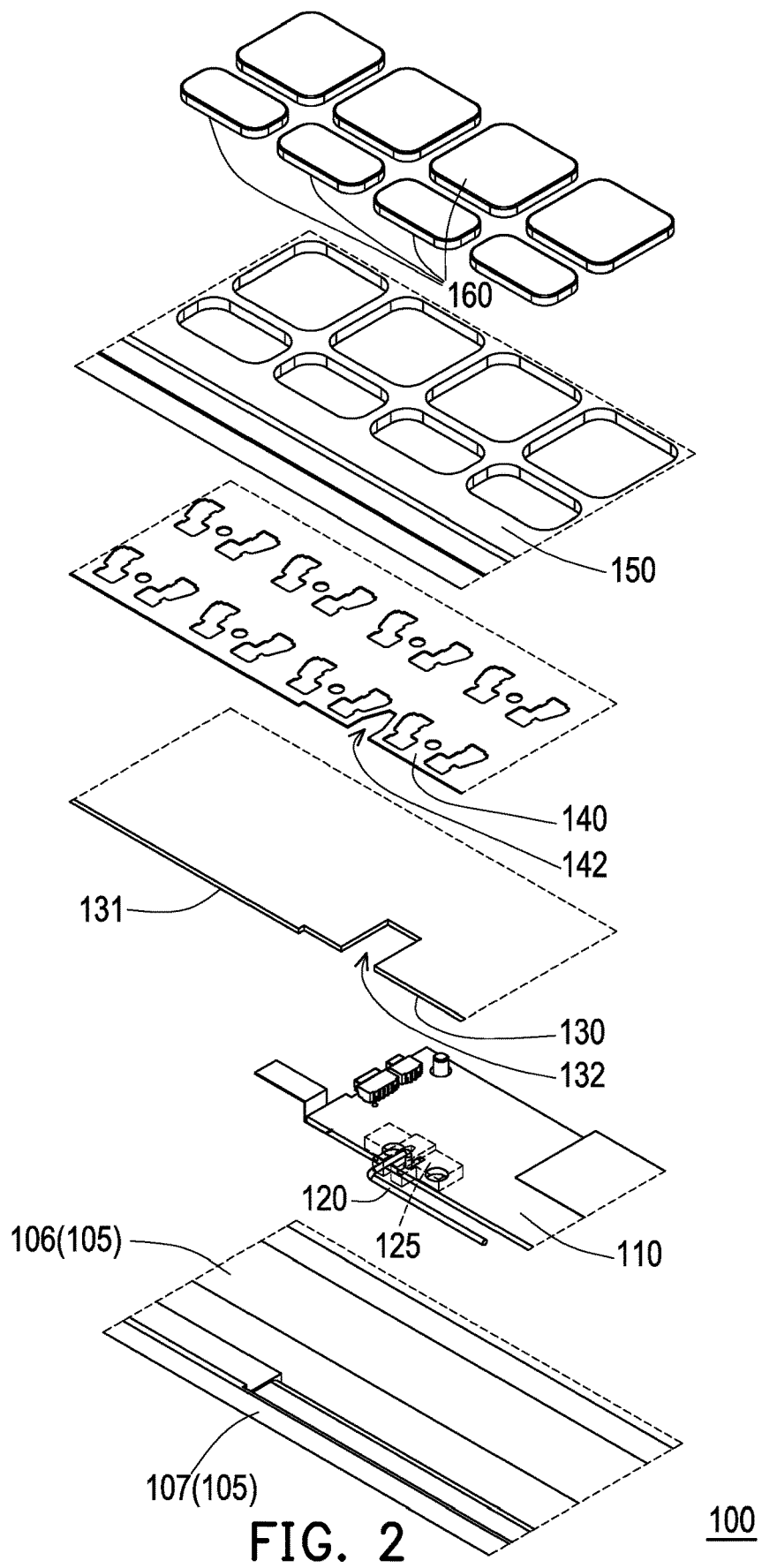
FIG. 2 is a schematic local exploded view of the keyboard module of FIG. 1.

FIG. 1 is a schematic view of a keyboard module according to an embodiment of the disclosure. Referring to FIG. 1, a keyboard module 100 of the embodiment is, for example, a wireless keyboard module, which may transmit wireless signals and features a special design to provide good antenna performance, and description thereof is provided as follows. FIG. 2 is a schematic local exploded view of the keyboard module of FIG. 1. It should be noted that in order to clearly show antenna-related components, FIG. 2 is an exploded view after FIG. 1 is rotated by 180 degrees.

Referring to FIG. 2, the keyboard module 100 of the embodiment includes a housing 105, an antenna circuit board 110, an antenna 120, a supporting bracket 130, a thin-film circuit board 140, a decoration board 150, and a plurality of key caps 160. The housing 105 includes a bottom wall 106 and a side wall 107. The housing 105 is made of, for example, an insulating material, such as plastic, but the type of the housing 105 is not limited thereto. The antenna circuit board 110 is disposed above the bottom wall 106. The supporting bracket 130 is disposed above the antenna circuit board 110.

In this embodiment, the supporting bracket 130 is, for example, a metal plate configured to enhance structural strength. In an embodiment, the keyboard module 100 may include a scissor-like linkage structure (not shown). The scissor-like linkage structure may be disposed between the supporting bracket 130 and the key caps 160 to connect and guide the key caps 160 to ascend and descend relative to the supporting bracket 130.

As shown in FIG. 2, the supporting bracket 130 includes a notch 132 recessed into an edge 131, and the notch 132 faces the side wall 107 of the housing 105. In this embodiment, the side wall 107 refers to, for example, a side wall closest to function keys (most front row) of the keyboard module. Therefore, the notch 132 faces a front side of the keyboard module 100, i.e., the side away from a user.

The thin-film circuit board 140 is disposed above the supporting bracket 130 and has a notch 142 corresponding to the notch 132. The decoration board 150 is arranged above the thin-film circuit board 140, and the key caps 160 are movably arranged above the decoration board 150. In this embodiment, the notch 132 of the supporting bracket 130 is, for example, a rectangular notch, and a shape of the notch 142 of the thin-film circuit board 140 is, for example, a U shape. An opening width of the U shape is greater than a bottom width of the U shape. Moreover, a width (e.g., 6.5 millimeter (mm)) of the notch 132 of the supporting bracket 130 is greater than a width (e.g., 3.8 mm) of the notch 142 of the thin-film circuit board 140. Certainly, the shapes and sizes of the notch 132 of the supporting bracket 130 and the notch 142 of the thin-film circuit board 140 are not limited thereto. The notch 132 of the supporting bracket 130 and the notch 142 of the thin-film circuit board 140 may be of any shape without affecting the antenna 120 and a key function/stroke etc.

Figure 3A:
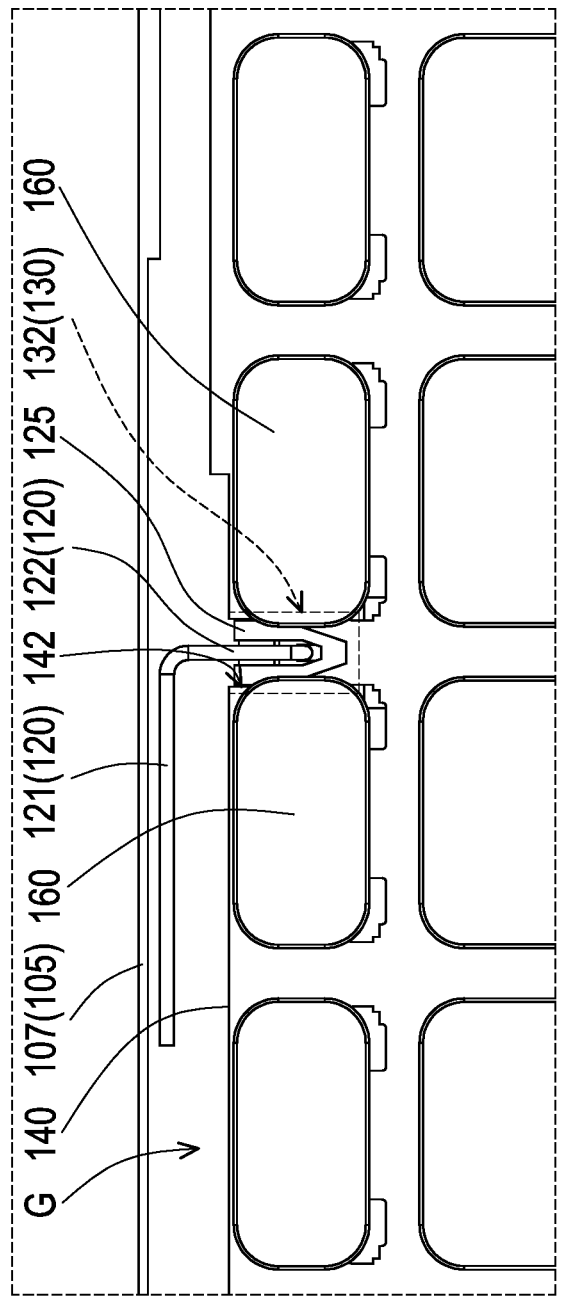
FIG. 3A is a schematic local top view of the keyboard module of FIG. 1 with a decoration board hidden.
Figure 3B:
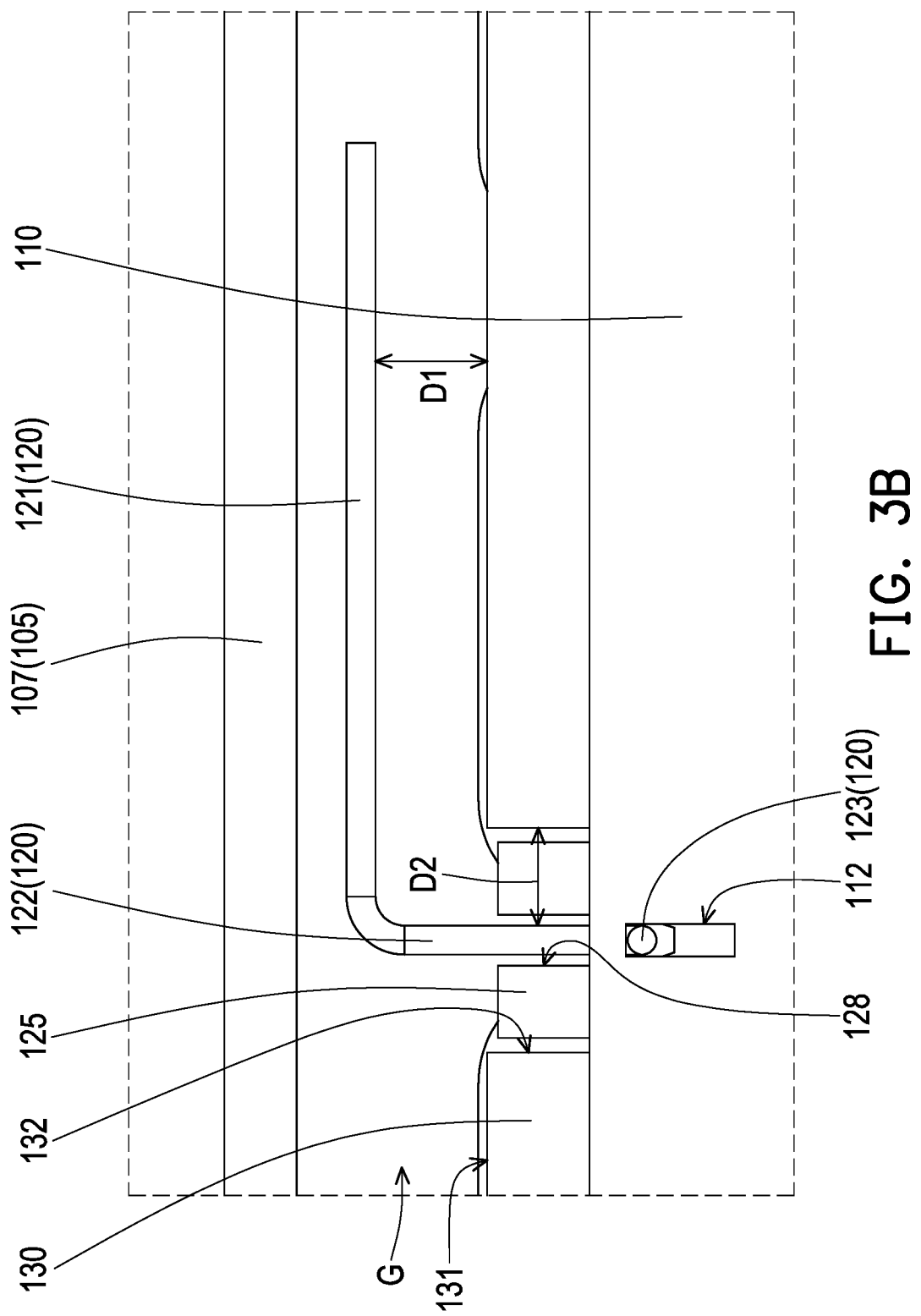
FIG. 3B is a local bottom view of the keyboard module of FIG. 1.

FIG. 3A is a schematic local top view of the keyboard module of FIG. 1 with a decoration board hidden. FIG. 3B is a local bottom view of the keyboard module of FIG. 1. It should be noted that FIG. 3B is another viewing angle of FIG. 3A when FIG. 3A is turned upside down by 180 degrees, and in FIG. 3B, the bottom wall of the housing 105 is hidden.

Referring to FIG. 3A and FIG. 3B, the notch 142 of the thin-film circuit board 140 corresponds to the notch 132 of the supporting bracket 130, and the notch 142 and the notch 132 both correspond to a position between two of the key caps 160. It may be seen from FIG. 3A that in this embodiment, the key caps 160 are arranged in a plurality of rows, and a projection of the notch 132 on a plane where the key caps 160 are located only corresponds to the row closest to the side wall 107. In addition, as shown in FIG. 3B, a gap G is formed between the edge 131 of the supporting bracket 130 and the side wall 107, and the antenna 120 is disposed in the gap G and bent into the notch 132.

Figure 4:
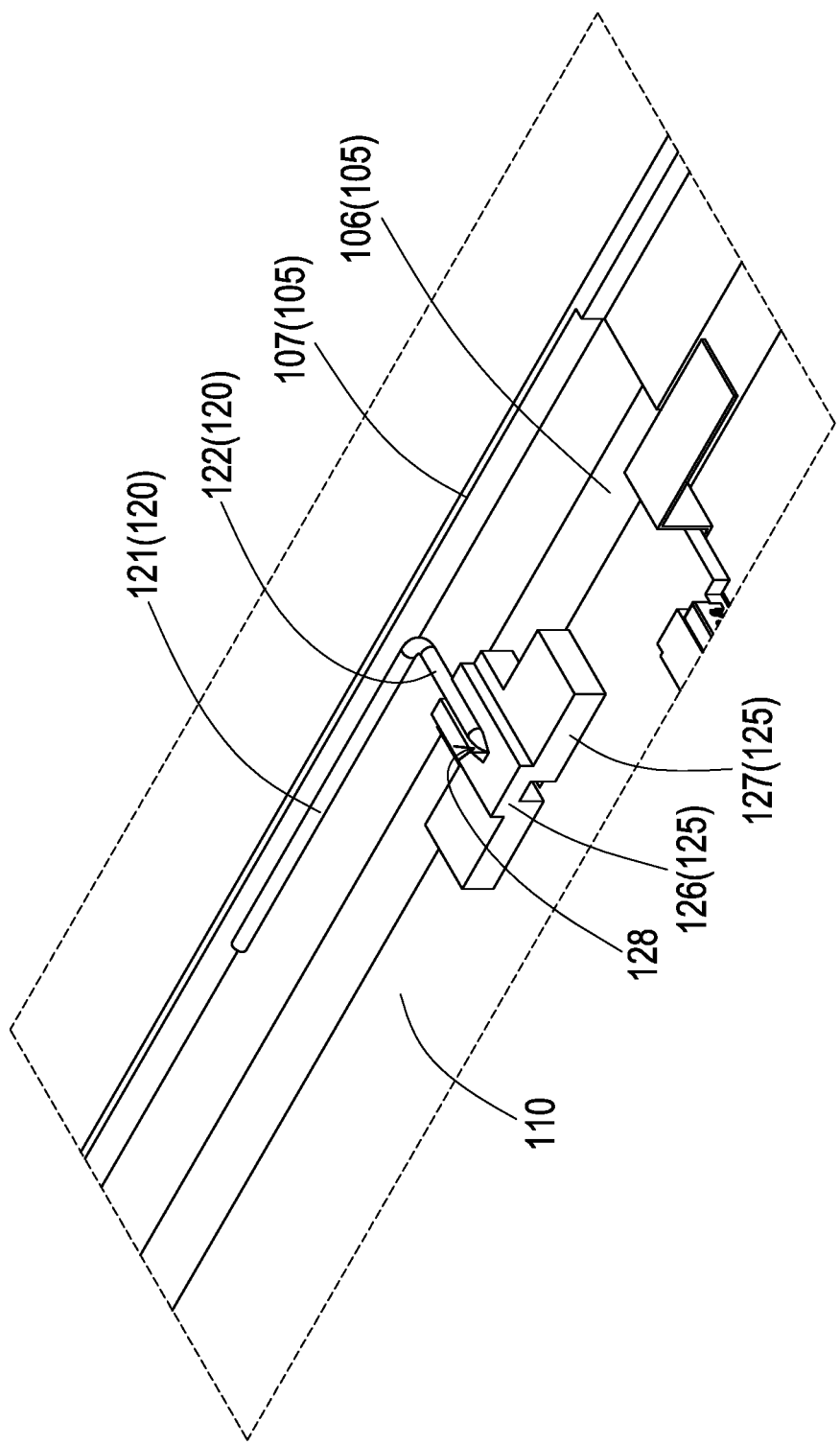
FIG. 4 is a schematic local three-dimensional view of a housing, an antenna circuit board, an antenna, and an insulating bracket of the keyboard module of FIG. 1.
Figure 5A:
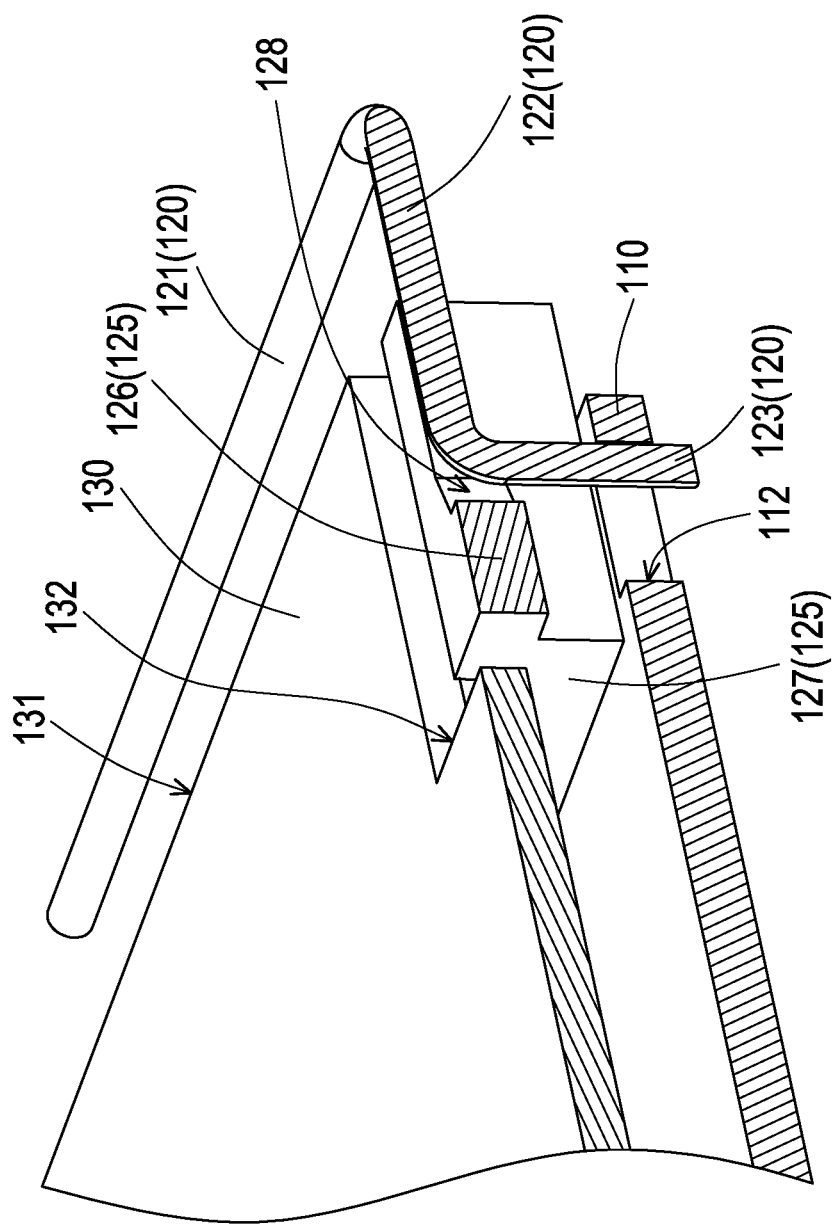
FIG. 5A is a schematic local three-dimensional cross-sectional view of a supporting bracket, the antenna circuit board, the antenna, and the insulating bracket of the keyboard module of FIG. 1.
Figure 5B:
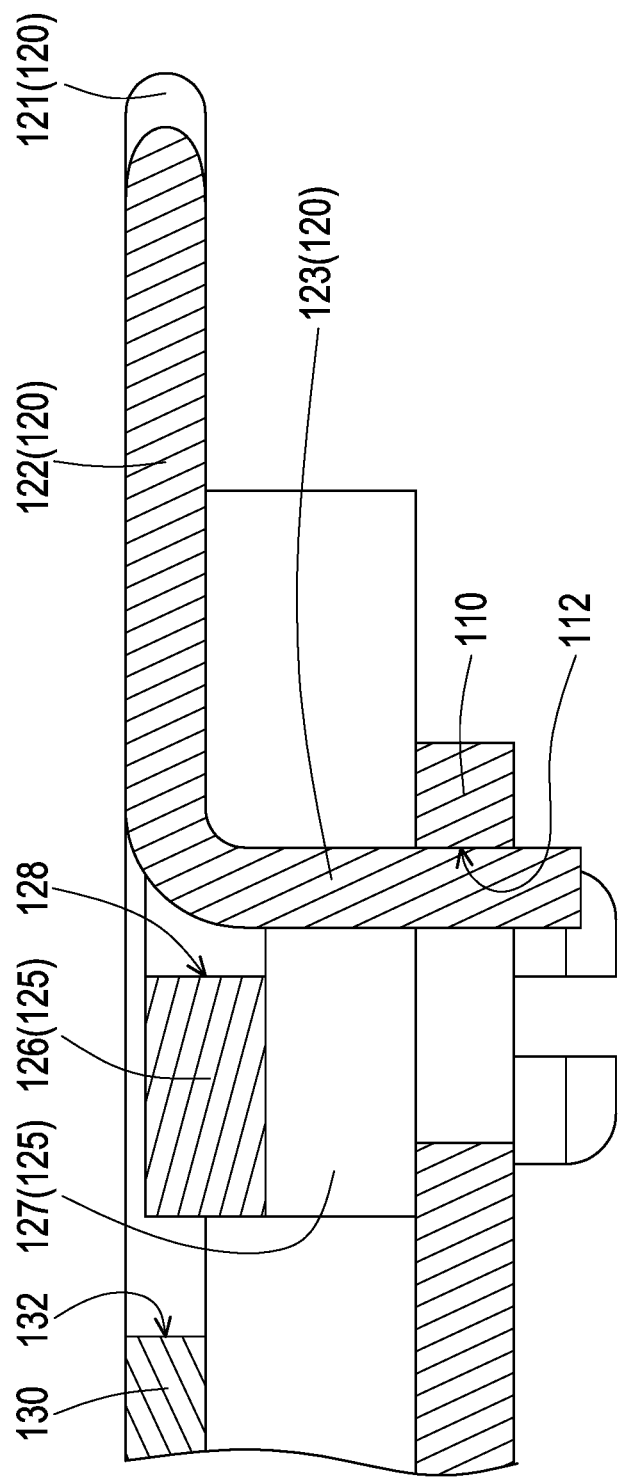
FIG. 5B is a front view of FIG. 5A.

FIG. 4 is a schematic local three-dimensional view of a housing, an antenna circuit board, an antenna, and an insulating bracket of the keyboard module of FIG. 1. FIG. 5A is a schematic local three-dimensional cross-sectional view of a supporting bracket, the antenna circuit board, the antenna, and the insulating bracket of the keyboard module of FIG. 1. FIG. 5B is a front view of FIG. 5A.

Referring to FIG. 3B, FIG. 4, FIG. 5A, and FIG. 5B together, in this embodiment, the antenna 120 includes a first portion 121, a second portion 122 bendably connected to the first portion 121, and a third portion 123 bendably connected to the second portion 122 (FIG. 5A). The first portion 121 of the antenna 120 is located in the gap G (FIG. 3B). The first portion 121 of the antenna 120 is a straight-line section close to the side wall 107 of the housing 105 and is parallel to the side wall 107. The second portion 122 of the antenna 120 is also a straight-line section, is perpendicular to the first portion 121, and extends into the notch 132 of the supporting bracket 130. The third portion 123 of the antenna 120 is also a straight-line section, is perpendicular to the second portion 122, and extends toward the antenna circuit board 110. That is, with a goal of increasing antenna efficiency, the first portion 121 is perpendicular to the second portion 122, and the second portion 122 is perpendicular to the third portion 123, so as to increase a distance between the antenna 120 and the supporting bracket 130, and that a clearance zone may be expanded.

Certainly, in other embodiments, the first portion 121 and the second portion 122 may not need to be perpendicular, the second portion 122 and the third portion 123 may not need to be perpendicular, and the first portion 121 and the side wall 107 may not need to be parallel, which is actually determined according to the type of antenna and is not limited thereto.

It should be noted that in an embodiment, if the size of the notch 132 of the supporting bracket 130 is sufficiently large, the antenna 120 may also be formed by bending an iron piece into a planar inverted-F antenna (PIFA).

Moreover, referring to FIG. 4, the keyboard module 100 further includes an insulating bracket 125 disposed on the antenna circuit board 110 and configured to support the second portion 122 of the antenna 120. In detail, the insulating bracket 125 includes a bottom structure 127 and a top structure 126. The bottom structure 127 is disposed on the antenna circuit board 110, and the top structure 126 includes a slot 128. The second portion 122 of the antenna 120 extends into the slot 128 of the top structure 126.

It may be seen from FIG. 5A and FIG. 5B that the first portion 121 and the second portion 122 of the antenna 120 are coplanar to reduce bending on different planes, so that antenna performance is prevented from being lowered by bending of the antenna on different planes. In addition, in this embodiment, the first portion 121 and the second portion 122 of the antenna 120 may be coplanar with the supporting bracket 130, and such a design may facilitate horizontal polarization. However, the first portion 121 and the second portion 122 may not have to be coplanar with the supporting bracket 130. Besides, the insulating bracket 125 (e.g., plastic piece) is used to support the antenna 120, and the first portion 121 and the second portion 122 of the antenna 120 may be coplanar with a top surface of the top structure 126. In addition, the third portion 123 extends toward the antenna circuit board 110 after penetrating through the insulating bracket 125 and penetrates into a hole 112 of the antenna circuit board 110 to be connected to the antenna circuit board 110. In this embodiment, the third portion 123 of the antenna 120 is connected to a wall surface of the antenna circuit board 110 next to the hole 112 and is electrically connected to the antenna circuit board 110. In other embodiments, the antenna 120 may be bent again to be connected to a lower surface of the antenna circuit board 110 after penetrating through the antenna circuit board 110. Alternatively, in other embodiments, the antenna 120 may not have to penetrate through the antenna circuit board 110 but may be directly connected to an upper surface of the antenna circuit board 110.

Referring to FIG. 3B again, in this embodiment, a distance D1 between the first portion 121 of the antenna 120 and the edge 131 of the supporting bracket 130 is between 3 mm and 8 mm. As such, a sufficient distance is provided to prevent the first portion 121 of the antenna 120 from being interfered by the supporting bracket 130. A radiation field pattern and efficiency of the antenna 120 are thereby prevented from being decreased due to being too close to the metal supporting bracket 130, and the performance of the antenna 120 is thus improved. Certainly, an actual value of the distance D1 may be varied according to restrictions of an appearance design or a mechanism design, but it is not limited thereto.

In an embodiment, the distance D1 between the first portion 121 of the antenna 120 and the edge 131 of the supporting bracket 130 is 3 mm. Preferably, the distance D1 between the first portion 121 of the antenna 120 and the edge 131 of the supporting bracket 130 is greater than 5 mm.

Moreover, a distance D2 between the second portion 122 of the antenna 120 and the edge 131 of the supporting bracket 130 surrounding the notch 132 is between 1 mm and 2 mm, for example 1.5 mm. As such, a sufficient distance is provided to prevent the second portion 122 of the antenna 120 from being interfered by the supporting bracket 130. The interference caused by the supporting bracket 130 on the radiation field pattern of the antenna 120 is thereby lowered.

It should be noted that in this embodiment, the projection of the notch 132 on the plane where the key caps 160 are located only corresponds to the row of key caps 160 closest to the side wall 107. In other words, the antenna 120 may only extend between two of the keycaps 160 in the row closest to the side wall 107. In such a design, metal inside the keyboard module 100 is prevented from affecting the performance of the antenna 120 when the antenna 120 crosses over too many rows of the key caps 160.

Moreover, in this embodiment, the antenna 120 couples out to a frequency, and a length of the first portion 121 of the antenna 120 is less than or equal to ¼ wavelength of the frequency. In this embodiment, the frequency band is, for example, WiFi 2.4G Hz, and a length of the antenna 120 is approximately 30 mm to 31.5 mm. The antenna 120 is, for example, a monopole antenna. In other embodiments, the antenna 120 may also be a PIFA antenna, but the frequency band, the length, and the form of the antenna 120 are not limited thereto.

In this embodiment, in the keyboard module 100, the originally-existing gap G between the edge 131 of the supporting bracket 130 and the side wall 107 of the housing 105 is arranged to house the antenna 120, and the gap G is treated as a clearance zone of the antenna 120. In this way, a space on the antenna circuit board 110 is not required to be occupied, and the problem of insufficient clearance zone on the antenna circuit board 110 may be effectively solved. Further, the clearance zone is unnecessarily required to be provided on the antenna circuit board 110, such that the size of the antenna circuit board 110 may be reduced. In this way, the antenna performance is prevented from being affected due to insufficient antenna clearance zone, and the impact on a circuit layout on the circuit board may also be lowered.

In addition, the first portion 121 of the antenna 120 is arranged in the gap G, the second portion 122 of the antenna 120 extends into the notch 132 of the supporting bracket 130, and the third portion 123 of the antenna 120 directly extends downward vertically. That is, after the second portion 122 extends into the notch 132, the third portion 123 extends toward the antenna circuit board 110, and the antenna 120 does not overlap with the supporting bracket 130 in an up-down direction. That is, the supporting bracket 130 does not shield the antenna 120 in the up-down direction (vertical direction), such that the antenna efficiency is prevented from being affected, and the antenna 120 is allowed to provide a complete radiation field pattern.

Moreover, the antenna circuit board 110 overlaps with the supporting bracket 130, so that the antenna circuit board 110 is connected to a ground plane of the supporting bracket 130. The antenna circuit board 110 treats the supporting bracket 130 as a large ground plane, which may prevent the field pattern of the antenna 120 from generating high side lobes and null points due to incomplete ground plane in the antenna circuit board 110 to affect the performance of the antenna 120.

In addition, since the side wall 107 located on the front side of the antenna 120 may be made of a material that has a lower impact on the field pattern of the antenna 120, such as plastic. A material of the supporting bracket 130 located on the rear side of the antenna 120 is, for example, a metal plate. The supporting bracket 130 acting as the large ground plane may focus the field pattern of the antenna 120 toward the front (in a direction away from the user), so as to achieve the advantage of increasing radiation efficiency.

The efficiency of a conventional chip antenna is only 30% to 40%, while the antenna efficiency of the antenna 120 of this embodiment may reach 50% or greater. Specifically, through simulation, the antenna efficiency may reach 78.8%, and a gain of the antenna 120 is 2.98 dB, good performance is thereby provided.

In view of the foregoing, in the keyboard module provided by the disclosure, a gap is formed between the edge of the supporting bracket and the side wall of the housing. The supporting bracket includes a notch recessed into the edge, and the notch faces the side wall. The antenna is arranged in the gap, is bent into the notch, and is connected to the antenna circuit board. That is, in the keyboard module of the disclosure, the originally-existing gap between the edge of the supporting bracket and the side wall of the housing is arranged to house the antenna, and this gap is treated as the antenna clearance zone, so that the space on the antenna circuit board is not required to be occupied as an antenna clearance zone, and the problem of insufficient clearance zone may be effectively solved. In addition, the antenna is arranged in the gap and bent into the notch of the supporting bracket, and the antenna does not overlap with the supporting bracket in the up-down direction, as such, good performance is provided and a complete radiation field pattern is achieved.

What is claimed is:

1. A keyboard module, comprising:
   a housing, comprising a bottom wall and a side wall;
   an antenna circuit board, disposed above the bottom wall;
   a supporting bracket, disposed above the antenna circuit board, wherein a gap is formed between an edge of the supporting bracket and the side wall, the supporting bracket comprises a notch recessed into the edge, and the notch faces the side wall;
   an antenna, disposed in the gap, extending into the notch, and connected to the antenna circuit board; and
   a plurality of key caps, disposed above the supporting bracket.

2. The keyboard module according to claim 1, wherein the antenna comprises a first portion, and the first portion is located in the gap and is coplanar with the supporting bracket.

3. The keyboard module according to claim 2, wherein the first portion of the antenna is a straight-line section close to the side wall of the housing, and the first portion is parallel to the side wall.

4. The keyboard module according to claim 2, wherein the antenna comprises a second portion bendably connected to the first portion and a third portion bendably connected to the second portion, the second portion extends into the notch, and the third portion extends toward the antenna circuit board and is connected to the antenna circuit board.

5. The keyboard module according to claim 4, wherein the second portion of the antenna is a straight-line section perpendicular to the first portion, and the third portion of the antenna is a straight-line section perpendicular to the second portion.

6. The keyboard module according to claim 4, wherein a distance between the second portion and the edge of the supporting bracket surrounding the notch is between 1 mm and 2 mm.

7. The keyboard module according to claim 2, wherein a distance between the first portion of the antenna and the edge of the supporting bracket is between 3 mm and 8 mm.

8. The keyboard module according to claim 1, wherein the notch corresponds to a position between two of the key caps.

9. The keyboard module according to claim 1, wherein the key caps are arranged in a plurality of rows, and a projection of the notch on a plane where the key caps are located only corresponds to the row closest to the side wall.

10. The keyboard module according to claim 1, further comprising an insulating bracket arranged on the antenna circuit board and supporting the antenna.

11. The keyboard module according to claim 1, wherein the antenna couples out a frequency band, and a length of the antenna is less than or equal to ¼ wavelength of the frequency band.

12. The keyboard module according to claim 1, wherein a material of the side wall is an insulating material.

13. The keyboard module according to claim 1, wherein the antenna circuit board is connected to the supporting bracket.

* * * * *